United States Patent [19]
Demarest

[11] Patent Number: 4,837,969
[45] Date of Patent: Jun. 13, 1989

[54] BAIT STATION

[75] Inventor: Scott W. Demarest, Racine, Wis.

[73] Assignee: S. C. Johnson & Son, Inc., Racine, Wis.

[21] Appl. No.: 249,937

[22] Filed: Sep. 27, 1988

[51] Int. Cl.⁴ .............................................. A01M 1/20
[52] U.S. Cl. ........................................ 43/131; 43/124
[58] Field of Search ................................. 43/131, 124

[56] References Cited
U.S. PATENT DOCUMENTS

| | | | |
|---|---|---|---|
| 3,303,600 | 2/1967 | Freeman | 43/131 |
| 4,550,525 | 11/1985 | Baker et al. | 43/131 |
| 4,658,536 | 4/1987 | Baker | 43/131 |
| 4,761,912 | 8/1988 | Dyer et al. | 43/131 |

Primary Examiner—Nicholas P. Godici
Assistant Examiner—Carmine Cuda

[57] ABSTRACT

Insect bait stations which can be manufactured and packaged in blister pack arrays, each station having an apertured, multi-lobed cover which is fitted over a base having a central bait well, formed by a ramped structure and inner walls intersecting the ramped structure which serve as guides to direct an insect toward the bait.

4 Claims, 2 Drawing Sheets

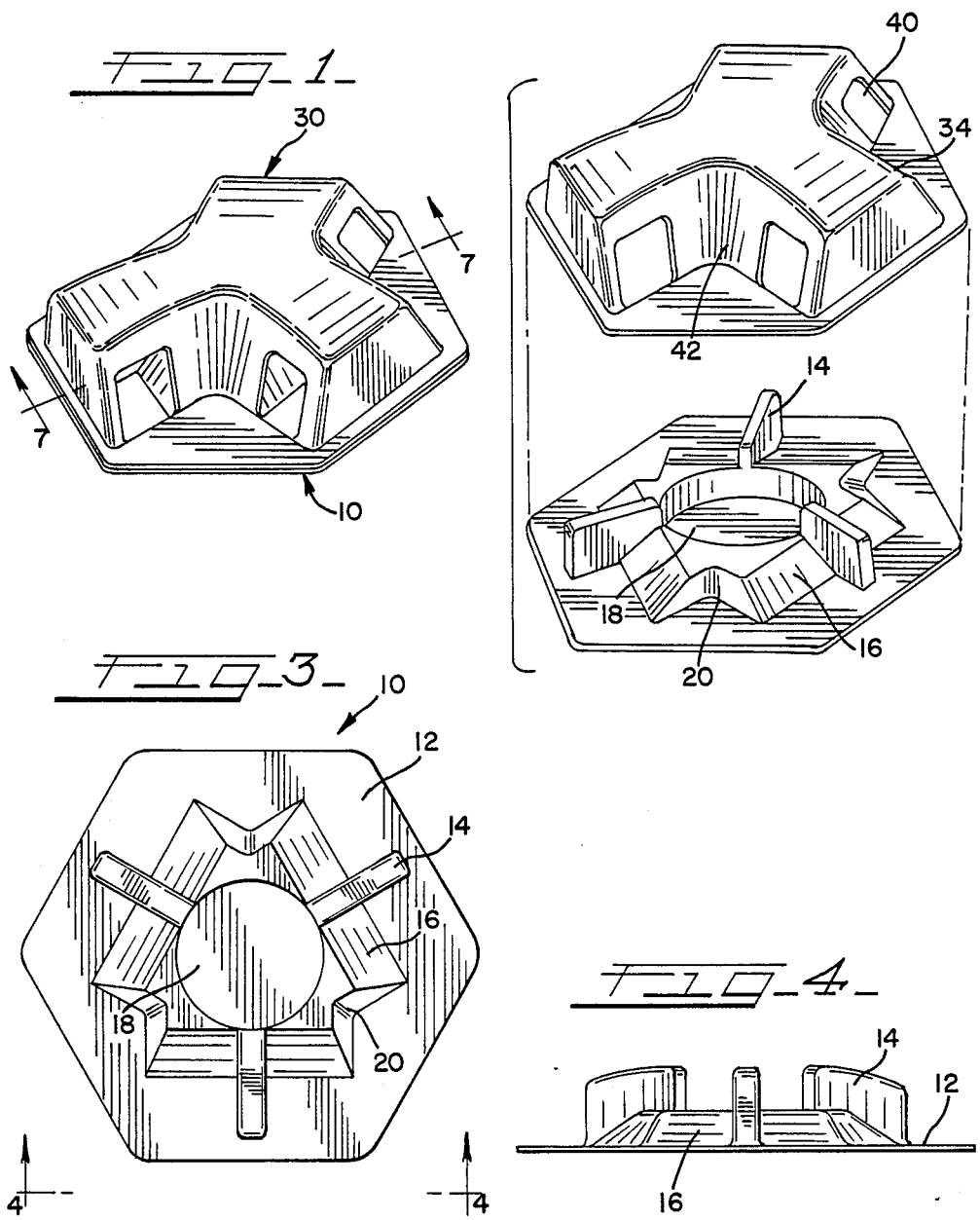
FIG_1_
FIG_2_
FIG_3_
FIG_4_

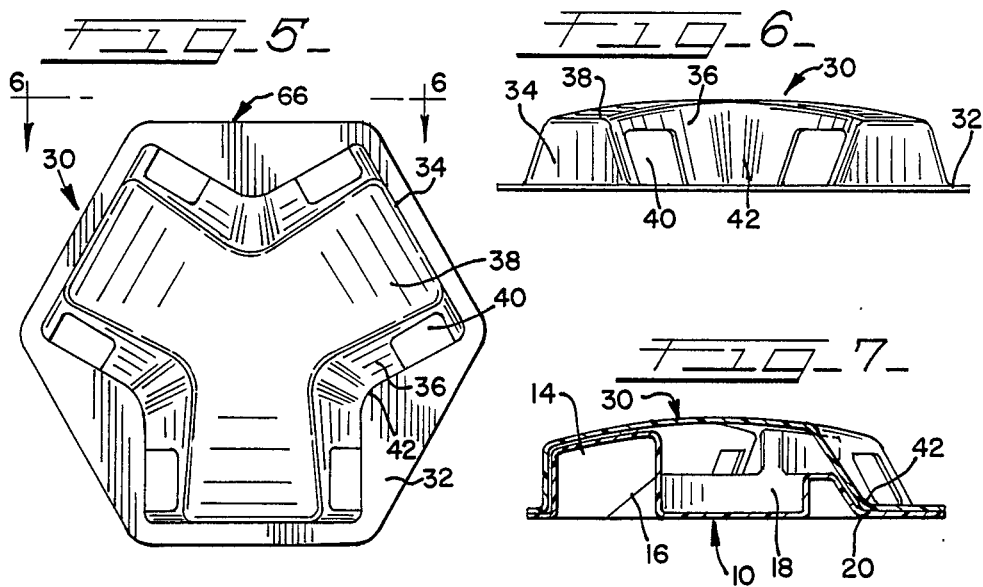
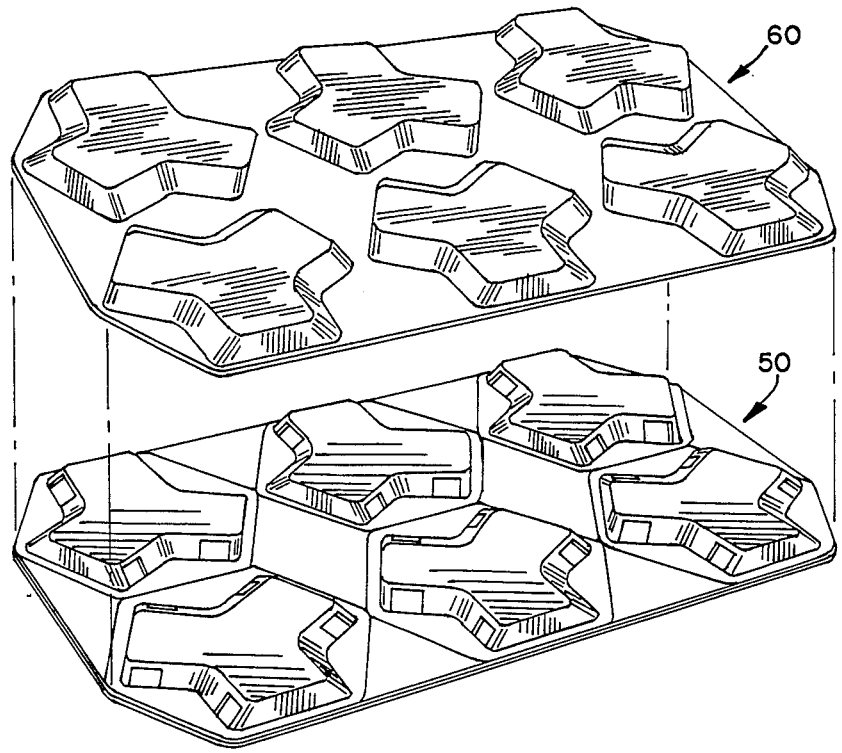

BAIT STATION

FIELD OF THE INVENTION

This device relates to the field of devices for control of insects and, more particularly, to a simple, inexpensive, yet safe device for containing a bait poisonous to insects in such a manner that insects have access to the bait yet the bait is doubly protected from being accessed by humans or animals.

BACKGROUND OF THE INVENTION

Many devices for holding a poisonous bait to control crawling insects are known, ranging from simple cardboard tubes open at both ends with the bait glued inside to more elaborate structures that have a centrally enclosed bait accessible by peripheral openings.

Early insect traps, as stated, lacked features to prevent access to the poisoned bait. Examples are U.S. Pat. No. 1,372,780, which discloses a bellshaped top having side apertures, which fits over and clamps to a dish shaped base, and U.S. Pat. No. 2,123,995, which discloses a flat piece of sheetmetal which is bent over an insecticidal substance to partially cover the substance while allowing insects direct access.

U.S. Pat. No. 4,563,836 to Woodruff et al. discloses an insect feeding station comprised of a simple cover which fits over a base, the base having external wall segments with entrance gaps between them and interior walls placed opposite the gaps and surrounding a central bait area. The outer walls of the present invention are formed by the cover; the entrance apertures are oriented at an angle to the required line of approach to the bait, and a ramped structure surrounds the bait well.

U.S. Pat. Nos. 278,032 and 278,842 discloses designs for insect feeding stations, simliar to those of the '836 patent, having a cover over a base with baffle means.

Pending U.K. patent application No. GB2128463A, discloses an insect feeding station having an aperture-containing cover placed over a base, the base having baffle means for directing an insect toward the central bait section. There is no teaching of a central ramp structure surrounding a bait well.

Pending U.S. patent application Ser. No. 07/069,338 to Demarest et al. discloses an insect bait device which has two substantially identical housing portions which are joined together to enclose an insecticide, the two housing portions together forming access apertures for insects. The possibility of multiple unit array manufacture is disclosed.

There are three main features that are desirable in such a trap:

the bait containing area must securely hold the bait so that no bait can become dislodged from the device;

the bait should be inaccessible even should a child attempt to probe the device with a stick or other object;

the device should be so constructed that insects have easy access to the bait.

Obviously these features are somewhat opposed, i.e., the structure allowing the most direct access for insects would also allow an animal or a curious child access to the poison.

Another desirable feature would be a device that would be easy and inexpensive to manufacture.

Thus, it is an object of the present invention to provide a bait station that provides a secure location for the bait that is inaccessible to children or animals.

It is also an object of the invention to provide a bait station that allows insects easy access to the bait.

It is a further object of the invention to provide a bait station that can be easily and cheaply manufactured.

SUMMARY OF THE INVENTION

In this invention, the insect bait is placed in a central well formed by a ramp structure rising out of a base. The base also has walls that are perpendicular to the bottom of the base and extend radially inward toward the central well, intersecting the ramp structure. A cover position with apertures for bait access fits over the base portion. The cover portion is formed into a plurality of lobes extending radially from the center in such a way that the center of the cover is positioned over the central bait well of the base and each wall rising from the base fits into a lobe of the cover portion. The apertures of the cover portion are located along the inner sides of these lobes in such way that an object or insect entering the aperture is directed into the face of the inner base wall and a turn of approximately 90° must be made to approach the central bait well. After such a turn, the insect must climb the ramp to reach the bait. Thus the bait is doubly protected from access by any object that a curious child might thrust therein. Access to the bait, by animals or children, is impossible since the bait is protected by the turn, the ramp, and the small size of the apetures.

The design of this station allows several of the bait station units to be formed attached to each other. Formation of the units in arrays on a web makes manufacture of the units easier and cheaper. Over such an array of the assembled units, a top preformed cover sheet can be fitted and attached to form a blister pack from which individual bait station units can be released by pressure on the top cover area over each unit.

BRIEF DESCRIPTION OF THE DRAWINGS

FIG. 1 is a perspective view of the assembled bait station.

FIG. 2 is an exploded view of the base portion and the cover portion of the station.

FIG. 3 is a top plan view of the base portion of the station.

FIG. 4 is a side view of the base portion taken along line 4—4 shown in FIG. 3.

FIG. 5 is a top plan view of the cover portion of the station.

FIG. 6 is a side view of the cover portion taken along line 66 shown in FIG. 5.

FIG. 7 is a cross-sectional view of the assembled station taken along line 7—7 of FIG. 1.

FIG. 8 shows a partially exploded view of an array of the stations and the top cover sheet for the array.

DESCRIPTION OF THE PREFERRED EMBODIMENTS

FIG. 1 shows a perspective view of cover 30 which is sitting over base 10. Both base 10 and cover 30 are seamless, each being formed from an individual piece of deformable material. Base 10 is shown in FIGS. 3 (top view) and 4 (side view). Base 10 has a peripheral flat portion, 12. From flat portion 12 rise perpendicularly inner walls 14 which extend from the periphery of base 10 toward the central area or well 18. Well 18 is defined by a surrounding ramped structure 16 which also rises from flat portion 12. Inner walls 14 intersect ramp structure 16 and stop at the periphery of well 18. Ramped structure 16 is also indented by notches 20.

Cover 30, shown in FIG. 5 (top view) and FIG. 6 (side view), has a peripheral flat area 32 and has a plurality of lobes 34 formed by outer wall 36 and a somewhat flattened top 38. Outer wall 36 defines entrance apertures 40 near the ends of lobes 34. Outer wall 36 forms an inward pointing angle 42 where two adjoining lobes 34 converge.

When cover 30 is placed over base 10, inner walls 14 are aligned within lobes 34 as shown by FIG. 2 (exploded view) and FIG. 7 (sectional view). Outer wall angles 42 fit into the corresponding notches 20 in the ramp structure 16 which surrounds well 18.

Operation of the bait station is best described by reference to FIG. 2. An insect desiring to reach bait placed inside well 18 would enter the device by any of the apertures 40. It would then be facing inner wall 14. It would then have to make a turn of approximately 90° and proceed parallel to inner wall 14 to reach well 18. But before reaching well 18, the insect would have to climb ramp structure 16.

Any object that a curious child (or adult) might poke into aperture 40 would have to follow the same route—turn and then climb—to come in contact with the bait in well 18. The chance of an object being thrust into the device and being used to remove bait is almost negligible.

The particular embodiment of this invention described and shown has the overall shape of a hexagon with three lobes, three inner walls, and three notches and angles. This form of the invention is ideally suited for multiple-array formation for manufacture and sale of the bait trap. One such possible array is portrayed in FIG. 8, which shows an array 50 of 6 units. For packaging, this array is overlaid with a separate top cover 60, corresponding in shape and number of units to the actual bait station array which is then attached to the array.

What is claimed is:

1. A bait station comprising a base portion and a cover portion, said base portion further comprising:
    a peripheral flat floor;
    an inner ramp structure angled upwardly and inwardly from the inner periphery of the floor to create a central well area;
    a plurality of wall structures extending radially inward perpendicular to the floor spaced at intervals around and intersecting the ramp structure; and
    a plurality of indentations spaced at intervals around the ramp structure,
said cover further comprising:
    a peripheral flat section for contacting the corresponding peripheral flat floor of the base portion;
    a multilobed structure rising above said flat section, the number of such lobes corresponding to the number of wall structures of the base so that, upon assembly of the device, an inner wall structure extends medially through each lobe, said cover having therein a plurality of apertures for insect access, said apertures being positioned along radially oriented sides of said lobes.

2. A bait station according to claim 1, the base and cover of which are formed of plastically deformable material.

3. A bait station according to claim 1 wherein the ramp section of the base portion has a plurality of indentations therein which mate with corresponding inner projections of the multilobed structure of the cover portion.

4. A bait station according to claim 3 wherein the multilobed structure of the cover is tripartite and the base portion has three inner walls and three notches in the ramp section.

* * * * *